United States Patent
Uranaka et al.

(10) Patent No.: US 9,523,142 B2
(45) Date of Patent: Dec. 20, 2016

(54) HOT-DIP ZINC ALLOY COATED STEEL SHEET EXCELLENT IN COATING ADHESION, AND METHOD FOR PRODUCING THE SAME

(71) Applicant: NISSHIN STEEL CO., LTD., Tokyo (JP)

(72) Inventors: Masaaki Uranaka, Osaka (JP); Takeshi Shimizu, Tokyo (JP); Kentaro Hirata, Hiroshima (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 14/773,398

(22) PCT Filed: Mar. 25, 2014

(86) PCT No.: PCT/JP2014/058208
§ 371 (c)(1),
(2) Date: Sep. 8, 2015

(87) PCT Pub. No.: WO2014/157155
PCT Pub. Date: Oct. 2, 2014

(65) Prior Publication Data
US 2016/0024632 A1     Jan. 28, 2016

(30) Foreign Application Priority Data

Mar. 27, 2013  (JP) ................................. 2013-066576
Mar. 24, 2014  (JP) ................................. 2014-060809

(51) Int. Cl.
*C23C 2/02*    (2006.01)
*C23C 2/06*    (2006.01)
(Continued)

(52) U.S. Cl.
CPC .............. *C23C 2/02* (2013.01); *B32B 15/013* (2013.01); *C21D 6/002* (2013.01); *C21D 6/005* (2013.01);
(Continued)

(58) Field of Classification Search
CPC ....... B32B 15/013; C21D 8/0473; C21D 9/46; C22C 38/00
(Continued)

(56) References Cited

U.S. PATENT DOCUMENTS 7,608,155 B2 * 10/2009 Sun ........................ C22C 38/002
148/320

FOREIGN PATENT DOCUMENTS

JP   2003-003238   1/2003
JP   2006-097063   4/2006
(Continued)

OTHER PUBLICATIONS

Machine translation of JP2003003238A, Jan. 2003.*

*Primary Examiner* — Jie Yang
(74) *Attorney, Agent, or Firm* — Clark & Brody (57) ABSTRACT

A method for producing a hot-dip zinc alloy coated steel sheet excellent in coating adhesion, comprising: hot-rolling a steel sheet, subjecting the base sheet for coating to a reduction heat treatment, and subjecting the base sheet for coating to hot-dip zinc alloy coating. The hot-dip alloy coated steel sheet is excellent in coating adhesion, by using, as a base sheet for coating, a steel sheet that is imparted with resistance to liquid metal embrittlement cracking by adding B. The hot-dip zinc alloy coated steel sheet excellent in coating adhesion contains at least one of a Si simple oxide, a Mn simple oxide, a Cr simple oxide, a Si—Mn composite oxide, a Si—Cr composite oxide, a Mn—Cr composite oxide, and a Si—Mn—Cr composite oxide in a portion within 10 μm from an interface between a steel sheet as a base sheet and a hot-dip galvanized layer formed on a surface thereof.

4 Claims, 1 Drawing Sheet (51) Int. Cl.
| | |
|---|---|
| C21D 9/46 | (2006.01) |
| C22C 18/04 | (2006.01) |
| C22C 38/00 | (2006.01) |
| C22C 38/38 | (2006.01) |
| C21D 8/02 | (2006.01) |
| C21D 8/04 | (2006.01) |
| B32B 15/01 | (2006.01) |
| C21D 6/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C22C 38/26 | (2006.01) |
| C22C 38/28 | (2006.01) |
| C22C 38/32 | (2006.01) |
| C23C 2/40 | (2006.01) |

(52) U.S. Cl.
CPC ............ *C21D 6/008* (2013.01); *C21D 8/0226* (2013.01); *C21D 8/0263* (2013.01); *C21D 8/0426* (2013.01); *C21D 8/0473* (2013.01); *C21D 8/0478* (2013.01); *C21D 9/46* (2013.01); *C22C 18/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/26* (2013.01); *C22C 38/28* (2013.01); *C22C 38/32* (2013.01); *C22C 38/38* (2013.01); *C23C 2/06* (2013.01); *C23C 2/40* (2013.01); *C21D 2211/004* (2013.01)

(58) Field of Classification Search
USPC .......................................................... 148/533
See application file for complete search history.

(56) References Cited

FOREIGN PATENT DOCUMENTS

| | | |
|---|---|---|
| JP | 2007-211279 | 8/2007 |
| JP | 2008-007842 | 1/2008 |
| JP | 2011-214041 | 10/2011 |
| JP | 2011-219783 | 11/2011 |
| JP | 2011-231346 | 11/2011 |
| JP | 2012-126994 | 7/2012 |

\* cited by examiner

HOT-DIP ZINC ALLOY COATED STEEL SHEET EXCELLENT IN COATING ADHESION, AND METHOD FOR PRODUCING THE SAME

TECHNICAL FIELD

The present invention relates to a hot-dip zinc alloy coated steel sheet that is improved in both the resistance to liquid metal embrittlement cracking and the coating adhesion simultaneously, which is a steel sheet that uses a steel types containing B and further containing at least one of Si, Mn and Cr as a base sheet for coating, and the base steel for coating having been subjected to hot-dip Zn—Al—Mg alloy coating, and relates to a method for producing the same.

BACKGROUND ART

A hot-dip zinc alloy coated steel sheet has been used for various purposes, but a welded zinc alloy coated steel sheet may have a problem that cracks are formed in a welding heat affected zone. This phenomenon is generally referred to as "liquid metal embrittlement cracking" and is considered to occur since the molten coating component acts on the grain boundary of the steel sheet to cause brittle fracture (grain boundary fracture).

In the zinc alloy coated steel sheet, a hot-dip Zn—Al—Mg alloy coated steel sheet is used in various purposes requiring corrosion resistance, such as a building material, due to the excellent corrosion resistance thereof. In recent years, a hot-dip Zn—Al—Mg alloy coated steel sheet has been increasingly applied to an alternative to an ordinary galvanized steel sheet. However, the hot-dip Zn—Al—Mg alloy coated steel sheet has a higher tendency to suffer liquid metal embrittlement cracking than the ordinary hot-dip galvanized steel sheet.

As a measure for preventing the liquid metal embrittlement cracking, it has been known that a base sheet for coating containing B is effectively used (see PTL 1).

CITATION LIST

Patent Literatures

PTL 1: JP-A-2003-003238
PTL 2: JP-A-2006-097063
PTL 3: JP-A-2011-214041
PTL 4: JP-A-2008-007842

SUMMARY OF INVENTION

Technical Problem

A hot-dip Zn—Al—Mg alloy coated steel sheet is being applied to various purposes by using the high corrosion resistance thereof, and there are increasing needs for the alloy coated steel sheet in the purpose of a high-tensile strength steel sheet. PTL 2 describes a technique of producing a hot-dip Zn—Al—Mg alloy coated steel sheet using, as a base sheet for coating, a steel types for a high-tensile strength steel sheet containing a relatively large amount (approximately 2% by mass) of Mn. However, there is no particular consideration of liquid metal embrittlement cracking, and there may be cases where the use of the steel sheet for welding involves a problem of liquid metal embrittlement cracking.

PTL 3 also describes a technique of producing a hot-dip Zn—Al—Mg coated steel sheet using, as abase sheet for coating, a high-tensile strength steel sheet containing a relatively large amount (1% by mass or more) of Mn. The base sheet for coating that is applied to the technique contains B for preventing liquid metal embrittlement cracking. However, there is described that the use of a high-strength steel types containing B with a relatively large amount of Mn as a base sheet for coating may cause another problem of deteriorating the adhesion of the hot-dip Zn—Al—Mg alloy coated layer. The application of a steel sheet having deteriorated coating adhesion to bending work may cause a problem due to peeling of the coating in the bent portion. In this technique, the retention time of the reduction heat treatment and the temperature of the reduction heat treatment are strictly controlled, and even in a case of a base sheet for coating containing B, the reduction heat treatment is completed before a large amount of B is diffused to the surface and thereby the problem of deteriorated coating adhesion is solved.

PLT 4 describes a technique of producing a hot-dip Zn—Al—Mg alloy coated steel sheet using a high-strength steel sheet containing a large amount (1.5% by mass or more) of Mn. The base sheet for coating used in this technique does not contain B, but the literature describes that hot-dip Zn—Al—Mg alloy coating performed may cause a problem of failure of coating or deterioration of the coating adhesion. In this technique, the problem of failure of coating or deterioration of the coating adhesion may be solved by controlling the reductive atmosphere in the reduction heat treatment to make $SiO_2$ in the surface portion of the steel sheet in an internally oxidized state.

However, the technique is complicated since in the reducing zone where the reduction heat treatment is performed, the oxygen partial pressure $PO_2$ in the atmosphere of the reducing zone is necessarily controlled to the prescribed range for such a purpose that the external oxidation of Si is prevented while reducing Fe, and at least one Si oxide selected from $FeSiO_3$, $Fe_2SiO_4$, $MnSiO_3$, and $Mn_2SiO_4$ is formed on the surface or the surface side of the steel sheet.

A reduction heat treatment is also a treatment for conditioning the metal structure to impart the prescribed capability to the mechanical characteristics of the coated steel sheet by exposing the steel sheet to a high temperature for the heat treatment. There is a problem that the retention time of the reduction heat treatment may not be prolonged when the conditioning of a metal structure of a steel sheet containing Si, Mn or Cr, and B simultaneously is performed according to the combination of the temperature and the retention time for the reduction heat treatment providing good coating adhesion described in PTL 3. In production equipment for performing continuously reduction heat treatment and hot-dip coating, there are cases where the transfer speed of the steel sheet is decreased due to some operational reasons. In these cases, it may be advantageous when the coating adhesion is ensured even though the retention time is prolonged.

In consideration of the circumstances shown above, an object of the invention is to produce a hot-dip Zn—Al—Mg alloy coated steel sheet that is excellent in coating adhesion, by using, as a base sheet for coating, a steel sheet that is imparted with resistance to liquid metal embrittlement cracking by adding B.

Solution to Problem

The object may be achieved in such a manner that for a base sheet for coating containing B, the coiling temperature condition on hot-rolling the steel sheet and the reduction heat treatment condition on immersing the steel sheet into a hot-dip galvanizing bath are defined, and thereby the surface of the steel sheet on the reduction heat treatment is prevented from being covered with the Si—Mn—B based oxide, so as to ensure the coating adhesion.

In the invention, a hot-dip zinc alloy coated steel sheet that is excellent in coating adhesion is obtained in such a manner that contains:

using, as a base sheet for coating, a steel sheet containing from 0.01 to 0.20% of C, from 0.030% or less of P, 0.010% or less of S, from 0.010 to 0.150% of Ti, 0.100% or less of sol. Al, less than 0.010% of N, from 0.0003 to 0.0100% of B, and at least one selected from the group consisting of from 0.01 to 1.00% of Si, from 0.10 to 2.50% of Mn, and from 0.05 to 1.00% of Cr, all in terms of percentage by mass, with the balance of Fe and unavoidable impurities;

coiling a hot-rolled steel sheet in a range of from 550 to 700° C.; and on performing hot-dip zinc alloy coating containing from 1.0 to 22.0% of Al and from 0.1 to 10.0% of Mg, all in terms of percentage by mass, with the balance of Zn and unavoidable impurities, subsequent to a reduction heat treatment, in the reduction heat treatment, assuming that a period of time during which a temperature on a surface of the steel sheet is maintained to 750° C. or more in a furnace for the reduction heat treatment is designated as a retention time, and the maximum achieving temperature of the surface of the steel sheet in the furnace is designated as a reduction heat treatment temperature, performing the reduction heat treatment, at a reduction heat treatment temperature of from 750 to 860° C., for a retention time of 250 seconds or less in the case where the concentrations of Si and Mn in a portion within 4 µm from the surface of the steel sheet before the reduction heat treatment satisfy the condition A shown below, a retention time of 200 seconds or less in the case where the concentrations satisfy the condition B shown below, or a retention time of 150 seconds or less in the case where the concentrations satisfy the condition C shown below.

Concentrations of Si and Mn in a portion within 4 µm from the surface of the steel sheet before the reduction heat treatment (in terms of percentage by mass)
A: 0.15% or less of Si and 0.8% or less of Mn
B: 0.6% or less of Si and 1.5% or less of Mn, but condition A not satisfied
C: more than 0.6% of Si and more than 1.5% of Mn In the aforementioned embodiment, the hot-dip zinc alloy coating may contain at least one selected from the group consisting of 0.10% or less of Ti, 0.05% or less of B, and 2.0% or less of Si, all in terms of percentage by mass.

According to the aforementioned production method, at least one of a Si simple oxide, a Mn simple oxide, a Cr simple oxide, a Si—Mn composite oxide, a Si—Cr composite oxide, a Mn—Cr composite oxide, and a Si—Mn—Cr composite oxide is formed in a portion within 10 µm from the surface of the steel sheet as a base sheet for coating on coiling in hot rolling. The internal oxide is formed due to the fact that the base sheet for coating contains, as the chemical composition thereof, at last one selected from the group consisting of from 0.01 to 1.00% of Si, from 0.10 to 2.50% of Mn, and from 0.05 to 1.00% of Cr, all in terms of percentage by mass. The present inventors have found that when the base sheet for coating having the internal oxide formed therein is subjected to a reduction heat treatment, the diffusion of B to the surface layer is delayed even though a Si—Mn oxide is formed on the surface of the steel sheet in a reductive atmosphere.

The inventors have also found that the concentrations of Si and Mn within 4 µm from the surface of the steel sheet having been coiled on hot rolling under the aforementioned condition and having the internal oxide formed therein are decreased from the contents of Si and Mn of the steel sheet. In other words, a Si and Mn deficiency layer is present on the surface of the steel sheet. A hot-dip Zn—Al—Mg alloy coated steel sheet excellent in coating adhesion may be obtained by setting the retention time of the reduction heat treatment corresponding to the concentrations.

Advantageous Effects of Invention

The invention provides a material as a steel sheet having hot-dip Zn—Al—Mg alloy coating with high corrosion resistance that is improved in both resistance to liquid metal embrittlement cracking and the coating adhesion simultaneously. It has been difficult to produce a hot-dip Zn—Al—Mg alloy coated steel sheet having both the characteristics simultaneously, but the invention contributes to the spread of the hot-dip Zn—Al—Mg alloy coated steel sheet for the purpose of a hot-dip zinc alloy coated steel sheet subjected to bending work and welding work.

DESCRIPTION OF EMBODIMENTS

In the description herein, the percentages for the chemical compositions of the base sheet for coating and the hot-dip coating are percentage by mass unless otherwise indicated.

Base Sheet for Coating

The chemical composition of the steel sheet that is used in the invention is as follows.

C: 0.01 to 0.20%

C is a basic element that ensures the strength of the steel sheet, and in the invention, a steel types that has a C content level of 0.01% or more is used. It may be managed to use one having a C content of 0.10% or more. However, excessive C contained may deteriorate the ductility and the weldability, and thus the C content is restricted to 0.20% or less.

Si: 0.01 to 1.00%

Si in the steel sheet may be a factor that forms a Si oxide film, which is harmful to the coatability, on the surface of the steel sheet. As a result of various investigations, the Si content is necessarily 1.00% or less. In the invention, however, Si is one of the major elements that form the internal oxide inside the surface of the steel sheet, and thus the content thereof is necessarily 0.01% or more. The content is more preferably 0.20% or more.

Mn: 0.10 to 2.50%

Mn in the steel sheet has a function of strengthening the steel material through solute strengthening, and has a function of stabilizing austenite and facilitating the formation of transformation phases, such as martensite, and thus the Mn content is necessarily 0.10% or more for ensuring the strength of the steel sheet and stabilizing the mechanical characteristics thereof. However, excessive Mn contained may be a factor of deteriorating the formability and the coatability, and thus the Mn content may preferably be restricted to 2.50% or less.

In the invention, on the other hand, Mn is one of the major elements that form the internal oxide inside the surface of the steel sheet, and thus the content thereof is necessarily 0.10% or more. The content is more preferably 0.20% or more.

Cr: 0.05 to 1.00%

Cr in the steel sheet also has a function of strengthening the steel material through solute strengthening, and is effective for suppressing the liquid metal embrittlement cracking, and in the invention, furthermore, is one of the major elements that form the internal oxide inside the surface of the steel sheet. Accordingly, the content thereof is necessarily 0.05% or more, and more preferably 0.20% or more. However, the addition thereof in an excessive amount may be a factor of deteriorating the formability, and the content thereof may preferably be restricted to 1.00% or less, and more preferably 0.50% or less.

P: 0.030% or Less

P has a function of strengthening the steel material through solute strengthening, but an excessive amount thereof contained may be a factor of deteriorating the formability, and in the invention, the content thereof is 0.30% or less, and more preferably 0.020% or less.

S: 0.010% or Less

S forms a sulfide becoming a factor of deteriorating the formability, and the content thereof is preferably decreased as much as possible. As a result of various investigations, the S content is allowable to be 0.010% at most and is more preferably 0.005% or less particularly for the purpose where the formability is important.

Ti: 0.010 to 0.150%

Ti is a strong nitride-forming element and is an important element for fixing N in the base sheet for coating as TiN. The fixation of N ensures the amount of free B, and thus the function of enhancing the resistance to liquid metal embrittlement cracking due to free B may be exhibited. As a result of various investigations, it is necessary to ensure a Ti content of 0.010% or more for sufficiently exhibiting the function. The content thereof is more preferably 0.020% or more. However, the effect may be saturated even though an excessive amount of Ti is added, and an excessive amount of Ti added may be a factor of deteriorating the formability of the steel material. Thus, the Ti content is restricted to a range of 0.150% or less.

Sol. Al: 0.100% or Less

Al is added as a deoxidizing agent, but the addition of Al in an excessive amount may cause problems, such as deterioration of the press formability, and the content thereof in terms of sol. Al (acid soluble Al) is restricted to 0.100% or less, and more preferably 0.060% or less. In the deoxidization, it is effective to add Al in such a range that the sol. Al content is 0.005% or more, and is more effective in such a range that the sol. Al content is 0.010% or more.

N: Less than 0.010%

N forms a boride through reaction with B and becomes a factor of decreasing the amount of free B, which is effective for improving the resistance to liquid metal embrittlement cracking. As a result of various investigations, the N content is restricted to a range of less than 0.010%.

B: 0.0003 to 0.0100%

B is an element that is effective for suppressing the liquid metal embrittlement. It is considered that the function thereof is provided in such a mechanism that B is segregated as free B at the crystal grain boundary to increase the interatomic bonding force. Accordingly, the B content is necessarily ensured to be at least 0.0003%, and the B content is more preferably ensured to be 0.0005% or more. However, the addition of B in an excessive amount may be a factor of the formation of a boride and deterioration of the formability, and thus the upper limit of the B content is restricted to 0.0100%.

Nb: 0.10% or Less

Nb has a function of fixing N and thus is an element that is effective for ensuring free B having a function of enhancing the resistance to liquid metal embrittlement cracking. Accordingly, the steel sheet of the invention may contain Nb depending on necessity. In the case where Nb is contained, the content thereof is effectively 0.001% or more. However, the addition thereof in an excessive amount may be a factor of deteriorating the formability, and thus the content of Nb is 0.10% or less, and preferably 0.05% or less.

Mo: 0.50% or Less

Mo also is an element that has a function of enhancing the resistance to liquid metal embrittlement cracking, and the steel sheet of the invention may contain Mo depending on necessity. In the case where Mo is contained, the content thereof is more effectively 0.01% or more. However, the addition thereof in an excessive amount may be a factor of deteriorating the formability, and thus the amount of Mo added is limited to 0.50% or less, and preferably 0.20% or less.

Hot Rolling

The slab subjected to hot rolling and the finishing temperature are not particularly limited, and those for an ordinary method may be used. The coiling temperature may be in a range of from 550 to 700° C. By coiling at that temperature, simple oxides and composite oxides of Si, Mn and Cr are formed as internal oxides in a portion within 10 μm from the surface of the steel sheet covered with oxide scale, and simultaneously a deficiency layer of Si and Mn is formed.

The base sheet for coating used in the invention may be a hot-rolled steel sheet or a cold-rolled steel sheet that has the aforementioned chemical composition. In the case where cold rolling is performed, cold rolling is performed subsequently according to an ordinary method to provide an intended sheet thickness. In the case of a hot-rolled steel sheet, it is necessary to remove oxide scale on the surface thereof sufficiently. The sheet thickness may be appropriately selected, for example, from a range of from 0.6 to 4.5 mm depending on the purposes.

Reduction Heat Treatment

Before immersing the base sheet for coating into a hot-dip zinc alloy coating bath, the base sheet for coating is generally subjected to a reduction heat treatment for activating the surface of the steel sheet. In a continuous hot-dip coating line in a mass production site, the reduction heat treatment and the hot-dip coating are continuously performed. The reduction heat treatment not only simply activates the surface of the base sheet for coating, but also is often performed as an annealing step for conditioning the metal structure of the steel sheet to the final structure condition. Accordingly, various heating patterns are employed depending on the purposes. In consideration of the operation condition of the line, furthermore, the speed of the steel strip (line speed) passing through the heat treatment furnace may be controlled within a range that does not impair the activation and the annealing.

As described above, a problem in coating adhesion may occur when a steel sheet containing B is subjected to hot-dip Zn—Al—Mg alloy coating. For determining the causes, the inventors have made close investigations on the state of the interface between the coated layer and the steel base after the hot-dip coating. As a result, a continuous Fe—Al alloy layer is formed at the interface between the coated layer and the steel base in a steel types containing no B, and the adhesion of the coated layer is ensured through the alloy layer. In the case of a steel types containing B, on the other hand, there are many portions found, in which a Fe—Al alloy layer is not formed at the interface between the coated layer and the steel base. It has been found that the coated layer and the steel base are not bonded to each other in those portions. Furthermore, some portions are found on the surface of the steel sheet, in which no coated layer is attached (i.e., a defect referred to as failure of coating).

For understanding the surface state of the base sheet for coating immediately before immersing in a hot-dip coating bath, a steel sheet specimen is subjected to a reduction heat treatment under various conditions, and the surface thereof is observed. According thereto, in a steel types containing no B providing good coating adhesion, a Si—Mn oxide is scattered on the surface, and the surface state is not changed largely even when the reduction heat treatment condition is changed. In a steel types containing B, on the other hand, such a surface state is provide in the initial stage of the reduction heat treatment that a Si—Mn oxide is scattered on the surface of the base sheet for coating, but it has been found that with the progress of heating, B diffused from the interior of the steel is added to the Si—Mn oxide, and the oxide scattered thereon becomes a Si—Mn—B oxide. With the further progress of the B diffusion from the interior of the steel, the concentration of B in the Si—Mn—B oxide on the surface of the steel sheet is increased to lower the melting point. It is considered as a result that the Si—Mn—B oxide is partially melted during the reduction heat treatment, and the molten material thus formed is spread over the flat area on the surface of the steel sheet. In a steel sheet having been heated to a high temperature for a long period of time, in fact, the most of the surface of the steel sheet is covered with the Si—Mn—B oxide and a film containing Si, Mn and concentrated B. In the surface portion with concentrated B, it is estimated that the reaction of Fe in the steel base and Al in the Zn—Al—Mg alloy coating bath is inhibited, and as a result, the bonding failure to the coated layer and the failure of coating are liable to occur.

Based on the finding, in the case where a steel types containing B as a base sheet for coating is subjected to a hot-dip Zn—Al—Mg alloy coating, the reduction heat treatment of coating pretreatment is completed before B is diffused in a large amount to the surface, thereby improving the coating adhesion. Specifically, good coating adhesion may be stably achieved by strictly controlling the combination of the retention time and the reduction heat treatment temperature of the reduction heat treatment within a proper range.

For sufficiently achieving the activation of the surface of the base sheet for coating, it is effective to expose the surface of the steel sheet to a reductive atmosphere at a temperature of 750° C. or more. As a result of detailed investigations, assuming that the period of time during which the temperature on the surface of the steel sheet is maintained to 750° C. or more in the furnace having the reductive atmosphere is designated as the retention time, and the maximum achieving temperature of the surface of the steel sheet in the furnace is designated as the reduction heat treatment temperature, the condition range of the reduction heat treatment that archives good coating adhesion stably may be determined by these parameters. In an actual operation, the concentrations of Si and Mn in the portion within 4 μm from the surface of the steel sheet depending on the combination of the steel types passing through the production line and the coiling temperature thereof are obtained by a preliminary experiment, and then the retention time of the reduction heat treatment is controlled depending on whether the combination of the Si concentration and the Mn concentration corresponds to any of the following conditions A to C.

Specifically, the reduction heat treatment is performed:
at a reduction heat treatment temperature of from 750 to 860° C.,
for a retention time of 250 seconds or less in the case where the concentrations of Si and Mn in a portion within 4 μm from the surface of the steel sheet before the reduction heat treatment satisfy the condition A shown below, a retention time of 200 seconds or less in the case where the concentrations satisfy the condition B shown below, or a retention time of 150 seconds or less in the case where the concentrations satisfy the condition C shown below.

Concentrations of Si and Mn in a portion within 4 μm from the surface of the steel sheet before the reduction heat treatment (in terms of percentage by mass)
A: 0.15% or less of Si and 0.8% or less of Mn
B: 0.6% or less of Si and 1.5% or less of Mn, but condition A not satisfied
C: more than 0.6% of Si and more than 1.5% of Mn In the case where the reduction heat treatment is also performed as the recrystallization annealing, such a condition within the aforementioned condition ranges may be employed that the interior of the steel sheet becomes the recrystallization temperature or higher. For a steel types of the case, the reduction treatment temperature (i.e., the maximum achieving temperature of the surface of the steel sheet) is preferably 740° C. or more within the aforementioned condition ranges.

The atmosphere applied to the reduction heat treatment may be an atmosphere that has been ordinarily used as a pretreatment of hot-dip coating. Examples of the atmosphere include a 5 to 50% by volume $H_2$—$N_2$ atmosphere.

Hot-Dip Zinc Alloy Coating

The base sheet for coating having been subjected to the aforementioned reduction heat treatment is then immersed in a hot-dip Zn—Al—Mg alloy coating bath without exposing to the air.

Al in the coating bath is effective for enhancing the corrosion resistance of the coated steel sheet and suppresses Mg oxide dross generation in the coating bath. The effect is found with an Al content of 4.0% or more in the hot-dip coating bath. Al is also effective for improving the coating adhesion, and for sufficiently providing the function in the invention, the Al content in the hot-dip coating bath is necessarily 1.0% or more. When the Al content exceeds 22.0%, on the other hand, a brittle Fe—Al alloy layer is excessively formed on the interface between the coated layer and the steel base material, which may be a factor that causes deterioration of the coating adhesion. For ensuring excellent coating adhesion, the Al content is preferably 15.0% or less, and it may be managed to be 10.0% or less.

Mg in the coating bath has a function of forming a uniform corrosion product on the surface of the coated layer to enhance the corrosion resistance of the coated steel sheet significantly. Mg is also effective for improving the coating adhesion. These functions are exhibited with a Mg content in the hot-dip coating bath of 0.10% or more, and for providing the effects significantly, it is preferred to ensure a Mg content of 1.0% or more. When the Mg content exceeds 10.0%, on the other hand, Mg oxide based dross is liable to be formed. For providing the coated layer with higher quality, the Mg content is preferably 5.0% or less, and may be managed to be 4.0% or less.

The presence of Ti and B contained in the hot-dip coating bath suppresses the formation and growth of a $Zn_{11}Mg_2$ phase, which imparts spotty appearance failure on a hot-dip Zn—Al—Mg alloy coated steel sheet. The addition of these elements enhances the degree of freedom in production conditions on hot-dip coating. Accordingly, any one or both of Ti and B may be added depending on necessity. The amount of Ti added is effectively 0.002% or more, and the amount of B added is effectively 0.001% or more. The excessive Ti content may form a Ti—Al precipitate in the coated layer, and the excessive B content may form an Al—B or Ti—B precipitate in the coated layer, followed by coarsening of the precipitates. The precipitates may be a factor of impairing the appearance of the surface of the coated layer. Accordingly, in the case where Ti is added to the coating bath, the content thereof is necessarily in a range of 0.10% or less, and more preferably 0.01% or less. In the case where B is added, the content thereof is necessarily in a range of 0.05% or less, and more preferably 0.005% or less.

The presence of Si contained in the hot-dip coating bath suppresses the excessive formation of a Fe—Al alloy layer formed on the interface between the steel base material and the coated layer, and is effective for enhancing the formability of the hot-dip Zn—Al—Mg alloy coated steel sheet. Si is also effective for preventing the coated layer from undergoing black discoloration and maintaining the surface gloss. Accordingly Si may be added depending on necessity. In the case where Si is contained, the Si content in the hot-dip coating bath is effectively 0.005% or more. However, the excessive Si content may be a factor of increasing the dross amount in the hot-dip coating bath, and thus the Si content in the coating bath is restricted to 2.0% or less.

The hot-dip coating bath generally unavoidably contains Fe since a steel sheet is immersed and passed therein. The Fe content in the Zn—Al—Mg alloy coating bath is allowable to be up to approximately 2.0%. The coating bath may contain other elements, for example, at least one kind of Ca, Sr, Na, rare earth elements, Ni, Co, Sn, Cu, Cr and Mn, in some cases, and the total content thereof is preferably managed to be 1.0% or less.

The coating deposition amount is preferably controlled to a range of from 20 to 300 $g/m^2$ per one surface of the steel sheet.

Example

A steel having the chemical composition shown in Table 1 was produced, and a slab thereof is heated to 1,250° C., followed by extraction, and hot-rolled at a finish rolling temperature of 880° C. and a coiling temperature of from 520 to 700° C., thereby providing a hot-rolled steel strip having a thickness of 2.4 mm. Subsequently, the hot-rolled steel strip was pickled and then cold-rolled to prepare a cold-rolled steel sheet having a thickness of 1.4 mm. In this stage, apart of the cold-rolled steel sheet was collected and embedded in a resin, and the cross section thereof in parallel to the sheet thickness direction was observed with a scanning transmission electron microscope (STEM), thereby quantitatively determining the Si concentration and the Mn concentration in the vicinity of the surface layer of the steel sheet (within a depth of 4 μm from the rolled surface) by energy dispersive X-ray spectrometry (EDX). The internal oxide was confirmed in such a manner that the cross section of the embedded specimen was etched with nital and observed with an optical microscope or a scanning electron microscope (SEM). A specimen where the formation of an oxide was confirmed in a region within a depth of 10 μm from the vicinity of the surface layer of the steel sheet on the cross section (the portion within a depth of 10 μm from the rolled surface) was shown by "◯" in Tables 2 and 3, and a specimen where the formation of an oxide was not confirmed therein was shown by "X" in Tables 2 and 3.

Subsequently, the cold-rolled steel sheet was subjected to a reduction heat treatment under various retention times and reduction heat treatment temperatures, and then immersed in a hot-dip zinc alloy coating bath without exposing to the air, followed by withdrawing from the bath, thereby providing a hot-dip zinc alloy coated steel sheet having a coating deposition amount of approximately 90 $g/m^2$ per one surface. The experiment conditions are as follows in addition to those shown in Tables 2 and 3.

Concentration of Si and Concentration of Mn in Surface Layer

The conditions corresponding to the above conditions A, B and C are shown by the symbols in Tables 2 and 3.

⊙: 0.15% or less of Si and 0.8% or less of Mn
◯: 0.6% or less of Si and 1.5% or less of Mn, but condition ⊙ not satisfied
●: more than 0.6% of Si and more than 1.5% of Mn Reduction Heat Treatment
Atmosphere gas: 30% $H_2$—$N_2$ atmosphere
Heat treatment temperature and retention time: shown in Tables 2 and 3
Hot-Dip Coating
Bath composition: shown in Tables 2 and 3
Bath temperature: 400° C.
Bath immersion time: 2 seconds
Evaluation of Coating Adhesion A bending test piece having a width of 15 mm was cut out from the obtained coated steel sheet, and subjected to a 90° V-bending test with a punch having a tip radius of 5 mm. The width direction of the test piece (i.e., the direction of the bending axis) was made to coincide with the rolling direction. A cellophane adhesive tape according to JIS Z1522 was attached to the outer circumferential surface of the bent portion of the test piece after subjecting to the bending test, and then peeled off. A specimen where no coated layer was attached to the tape was designated as good coating adhesion (◯), and the other specimens were designated as poor coating adhesion (X). Three specimens were subjected to the bending test for one kind of the coated steel sheet, and the test piece showing the worst evaluation result was designated as the result of the coated steel sheet. The results are shown in Tables 2 and 3.

Evaluation of Resistance to Liquid Metal Embrittlement Cracking

A specimen having a dimension of 100 mm×75 mm was cut out from the coated steel sheet and was used as a test piece for evaluating the maximum weld cracking length caused by liquid metal embrittlement due to arc welding.

Figure 1:
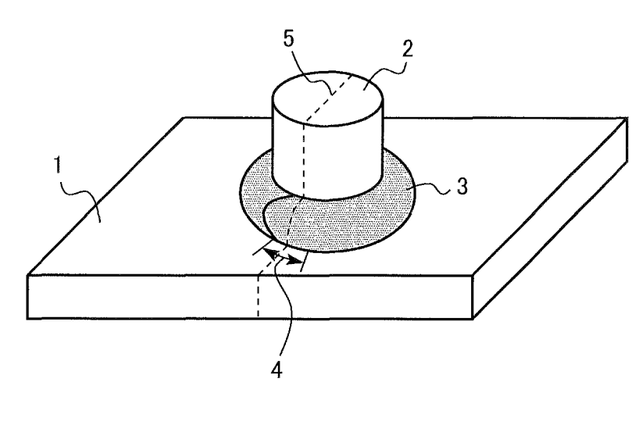
FIG. 1 is a schematic diagram showing a boss welding test performed for evaluating the resistance to liquid metal embrittlement cracking.

In the welding test, boss welding for forming a boss-welded member having the appearance shown in FIG. 1 was performed, and the cross section of the welded portion was observed to investigate the formation of cracks. Specifically, a boss (protrusion) 2 formed of mild steel having a diameter of 20 mm and a length of 25 mm was placed perpendicularly on the center of the sheet surface of the test piece 1, and the boss 2 was welded to the test piece 1 by arc welding. The welding conditions were a welding current of 217 A, a welding voltage of 25 V, a welding speed of 0.2 m/min, $CO_2$ as a shielding gas, and a shielding gas flow rate of 20 L/min. The welding wire used was YGW12.

The welding operation was performed from the welding start point, and after going around the boss and passing the welding start point, the welding operation was continued to form a portion 4 where the welding bead 3 overlapped each other.

After welding the boss, the test piece 1 and the boss 2 including the bead overlapping portion 4 were cut on the dashed line, and were embedded in a resin to allow the observation of the cut cross sectional surface 5, and the bead overlapping portion was observed with an optical microscope. In the case where a crack was observed in the portion of the test piece 1 in the cross section, the length of the crack was measured, and in the case where plural cracks were observed, the length of the longest crack was designated as the maximum crack length. The crack was formed along the prior austenite grain boundary in the portion influenced by the welding heat, and thus it was determined that the crack was liquid metal embrittlement cracking. In the evaluation of the resistance to liquid metal embrittlement cracking, a maximum crack length of 0.1 mm or less was designated as passed (◯), and that exceeding 0.1 mm was designated as failed (X).

The evaluation results are shown in Table 4. The steel types A to J and O were passed, but the four steel types K to N were failed.

TABLE 1

| Steel | Chemical composition (% by mass) | | | | | | | | | | | | Note |
|---|---|---|---|---|---|---|---|---|---|---|---|---|---|
| | C | Si | Mn | Cr | P | S | Ti | Nb | Mo | B | sol. Al | N | |
| A | 0.12 | 0.40 | 2.01 | 0.43 | 0.013 | 0.003 | 0.03 | — | — | 0.0036 | 0.033 | 0.0025 | steel of invention |
| B | 0.04 | 0.63 | 1.59 | 0.21 | 0.020 | 0.002 | 0.14 | 0.04 | — | 0.0032 | 0.039 | 0.0030 | |
| C | 0.15 | 0.40 | 1.80 | 0.05 | 0.012 | 0.003 | 0.10 | — | — | 0.0039 | 0.036 | 0.0024 | |
| D | 0.08 | 0.01 | 0.32 | 0.11 | 0.011 | 0.003 | 0.05 | 0.04 | — | 0.0015 | 0.035 | 0.0026 | |
| E | 0.13 | 0.43 | 2.19 | 0.61 | 0.019 | 0.002 | 0.03 | — | — | 0.0082 | 0.043 | 0.0025 | |
| F | 0.13 | 0.86 | 2.06 | 0.50 | 0.014 | 0.002 | 0.12 | 0.04 | — | 0.0020 | 0.035 | 0.0024 | |
| G | 0.19 | 0.39 | 0.11 | 0.40 | 0.013 | 0.003 | 0.04 | — | — | 0.0021 | 0.034 | 0.0027 | |
| H | 0.17 | 0.03 | 2.24 | 0.85 | 0.017 | 0.002 | 0.05 | — | — | 0.0064 | 0.038 | 0.0021 | steel of reference |
| I | 0.19 | 0.01 | 0.65 | 0.09 | 0.017 | 0.004 | 0.03 | — | — | 0.0031 | 0.036 | 0.0020 | |
| J | 0.11 | 0.60 | 1.79 | — | 0.014 | 0.002 | 0.03 | — | — | 0.0038 | 0.035 | 0.0027 | |
| K | 0.11 | 0.15 | 1.91 | — | 0.016 | 0.003 | — | — | — | — | 0.034 | 0.0023 | |
| L | 0.13 | 0.39 | 1.58 | — | 0.015 | 0.003 | — | 0.05 | — | — | 0.036 | 0.0022 | |
| M | 0.12 | 0.41 | 2.25 | — | 0.018 | 0.004 | 0.03 | — | — | — | 0.033 | 0.0025 | |
| N | 0.20 | 0.89 | 2.06 | — | 0.012 | 0.003 | 0.11 | — | — | — | 0.037 | 0.0024 | |
| O | 0.14 | 0.37 | 1.94 | — | 0.017 | 0.002 | 0.11 | 0.05 | 0.19 | 0.0020 | 0.043 | 0.0021 | steel of invention |

TABLE 2

| No. | Steel | Hot rolling coiling temperature (° C.) | Presence of internal oxide formed | Si and Mn concentration in vicinity of surface of steel sheet | Reduction heat treatment condition | | Coating bath composition (balance: Zn and unavoidable impurities) (% by mass) | | | | | Coating adhesion | Note |
|---|---|---|---|---|---|---|---|---|---|---|---|---|---|
| | | | | | Reduction heat treatment temperature (° C.) | Retention time (sec) | Al | Mg | Ti | B | Si | | |
| 1 | A | 650 | ◯ | ◯ | 850 | 90 | 5.9 | 2.8 | 0.019 | 0.0041 | 0.03 | ◯ | steel of the invention |
| 2 | A | 690 | ◯ | ⊙ | 840 | 120 | 19.8 | 5.1 | 0.031 | 0.0062 | 0.2 | ◯ | steel of the invention |
| 3 | A | 570 | ◯ | ● | 830 | 55 | 4.1 | 4.9 | 0.1 | 0.02 | — | ◯ | steel of the invention |
| 4 | A | 610 | ◯ | ◯ | 770 | 115 | 14.0 | 0.8 | 0.04 | 0.008 | 1.5 | ◯ | steel of the invention |
| 5 | A | 680 | ◯ | ⊙ | 890 | 45 | 4.7 | 1.4 | — | — | — | ◯ | steel of the invention |
| 6 | A | <u>530</u> | x | ● | 820 | 90 | 6.1 | 3.5 | 0.025 | 0.0049 | 0.02 | x | steel of comparative example |
| 7 | A | 640 | ◯ | ◯ | 825 | 35 | 1.5 | 1.1 | 0.08 | 0.016 | 0.02 | ◯ | steel of the invention |
| 8 | A | 565 | ◯ | ● | 800 | 75 | 8.5 | 6.0 | — | — | 0.03 | ◯ | steel of the invention |
| 9 | A | 700 | ◯ | ⊙ | 860 | 100 | 21.7 | 8.2 | 0.03 | 0.006 | 0.1 | ◯ | steel of the invention |
| 10 | B | 645 | ◯ | ⊙ | 850 | 100 | 5.9 | 2.8 | 0.019 | 0.0041 | 0.03 | ◯ | steel of the invention |
| 11 | B | 645 | ◯ | ⊙ | 850 | 100 | 5.9 | 2.8 | — | — | 0.03 | ◯ | steel of the invention |
| 12 | B | 590 | ◯ | ◯ | 840 | 60 | 10.3 | 7.6 | 0.008 | 0.002 | 0.5 | ◯ | steel of the invention |
| 13 | B | 685 | ◯ | ⊙ | 780 | 210 | 6.8 | 1.3 | 0.02 | 0.004 | 0.1 | ◯ | steel of the invention |

TABLE 2-continued

| | | Hot rolling coiling temperature (° C.) | Presence of internal oxide formed | Si and Mn concentration in vicinity of surface of steel sheet | Reduction heat treatment condition | | Coating bath composition (balance: Zn and unavoidable impurities) (% by mass) | | | | | Coating adhesion | Note |
|---|---|---|---|---|---|---|---|---|---|---|---|---|---|
| | | | | | Reduction heat treatment temperature (° C.) | Retention time (sec) | Al | Mg | Ti | B | Si | | |
| No. | Steel | | | | | | | | | | | | |
| 14 | B | 610 | ○ | ○ | 850 | <u>215</u> | 8.9 | 0.9 | 0.075 | 0.015 | 0.2 | x | steel of comparative example |
| 15 | B | 560 | ○ | ○ | 800 | 45 | 4.5 | 0.1 | — | — | — | ○ | steel of the invention |
| 16 | C | 690 | ○ | ⊙ | 800 | 220 | 5.9 | 2.8 | 0.019 | 0.0041 | 0.03 | ○ | steel of the invention |
| 17 | C | 575 | ○ | ○ | 860 | 70 | 16.8 | 8.1 | 0.03 | 0.006 | 0.5 | ○ | steel of the invention |
| 18 | C | 560 | ○ | ● | 830 | <u>170</u> | 7.3 | 2.5 | 0.02 | 0.004 | 0.03 | x | steel of comparative example |
| 19 | C | 560 | ○ | ● | 820 | 70 | 7.3 | 2.5 | 0.02 | 0.004 | 0.03 | ○ | steel of the invention |
| 20 | C | 640 | ○ | ⊙ | 800 | 195 | 2.2 | 3.0 | 0.1 | 0.02 | 0.03 | ○ | steel of the invention |
| 21 | C | 620 | ○ | ⊙ | 780 | 100 | 20.0 | 3.1 | 0.019 | 0.0041 | 1.5 | ○ | steel of the invention |
| 22 | D | 660 | ○ | ⊙ | 890 | 90 | 5.9 | 2.8 | 0.019 | 0.0041 | 0.03 | ○ | steel of the invention |
| 23 | D | 625 | ○ | ⊙ | 810 | 130 | 1.7 | 3.2 | 0.02 | 0.004 | 0.1 | ○ | steel of the invention |
| 24 | D | 590 | ○ | ⊙ | 850 | 160 | 4.2 | 1.6 | 0.02 | 0.004 | — | ○ | steel of the invention |
| 25 | E | 620 | ○ | ○ | 800 | 90 | 5.9 | 2.8 | 0.019 | 0.0041 | 0.03 | ○ | steel of the invention |
| 26 | E | 620 | ○ | ○ | 800 | 90 | 5.9 | 2.8 | 0.1 | 0.02 | 0.1 | ○ | steel of the invention |
| 27 | E | 520 | <u>x</u> | ● | 850 | 75 | 6.2 | 3.1 | 0.019 | 0.0041 | 0.03 | x | steel of comparative example |
| 28 | E | 660 | ○ | ⊙ | 780 | 205 | 6.2 | 3.1 | 0.019 | 0.0041 | 0.03 | ○ | steel of the invention |
| 29 | E | 700 | ○ | ⊙ | 870 | 125 | 10.0 | 2.4 | 0.02 | 0.004 | 0 | ○ | steel of the invention |
| 30 | E | 580 | ○ | ● | 830 | 75 | 3.1 | 1.8 | 0.02 | 0.004 | 0.02 | ○ | steel of the invention |
| 31 | F | 670 | ○ | ⊙ | 770 | 210 | 6.2 | 3.1 | 0.019 | 0.0041 | 0.03 | ○ | steel of the invention |
| 32 | F | 610 | ○ | ○ | 840 | 80 | 5.9 | 2.8 | 0.02 | 0.004 | 0.5 | ○ | steel of the invention |
| 33 | F | 550 | ○ | ● | 800 | 200 | 11.4 | 2.6 | 0.04 | 0.008 | 0.01 | x | steel of comparative example |
| 34 | G | 670 | ○ | ⊙ | 850 | 140 | 5.9 | 2.8 | 0.019 | 0.0041 | 0.03 | ○ | steel of the invention |
| 35 | G | 560 | ○ | ○ | 825 | 85 | 5.9 | 2.8 | 0.019 | 0.0041 | 0.1 | ○ | steel of the invention |
| 36 | H | 650 | ○ | ⊙ | 870 | 90 | 5.9 | 2.8 | 0.019 | 0.0041 | 0.03 | ○ | steel of the invention |
| 37 | H | 600 | ○ | ○ | 780 | 180 | 5.9 | 2.8 | 0.019 | 0.0041 | 0.02 | ○ | steel of the invention |
| 38 | I | 690 | ○ | ○ | 820 | 150 | 5.9 | 2.8 | 0.019 | 0.0041 | 0.03 | ○ | steel of the invention |
| 39 | I | 640 | ○ | ⊙ | 890 | 90 | 5.9 | 2.8 | 0.019 | 0.0041 | 0.05 | ○ | steel of the invention |
| 40 | I | 550 | ○ | ⊙ | 850 | 60 | 5.9 | 2.8 | 0.019 | 0.0041 | 2.0 | ○ | steel of the invention |
| 41 | J | 685 | ○ | ⊙ | 780 | 180 | 6.8 | 1.3 | 0.02 | 0.004 | 0.1 | ○ | steel of reference |
| 42 | J | 685 | ○ | ⊙ | 780 | 210 | 6.8 | 1.3 | 0.02 | 0.004 | 0.1 | x | steel of reference |

TABLE 3

| No. | Steel | Hot rolling coiling temperature (°C.) | Presence of internal oxide formed | Si and Mn concentration in vicinity of surface of steel sheet | Reduction heat treatment temperature (°C.) | Retention time (sec) | Al | Mg | Ti | B | Si | Coating adhesion | Note |
|---|---|---|---|---|---|---|---|---|---|---|---|---|---|
| 43 | A | 650 | ○ | ○ | 850 | 90 | 6.2 | 2.9 | 0.025 | 0.005 | — | ○ | steel of the invention |
| 44 | A | 565 | ○ | ● | 800 | 75 | 6.2 | 2.9 | 0.025 | 0.005 | — | ○ | steel of the invention |
| 45 | B | 645 | ○ | ⊙ | 810 | 125 | 6.2 | 2.9 | 0.025 | 0.005 | — | ○ | steel of the invention |
| 46 | G | 670 | ○ | ⊙ | 830 | 110 | 6.2 | 2.9 | 0.025 | 0.005 | — | ○ | steel of the invention |
| 47 | H | 600 | ○ | ○ | 780 | 180 | 6.2 | 2.9 | 0.025 | 0.005 | — | ○ | steel of the invention |
| 48 | A | 650 | ○ | ○ | 830 | 45 | 5.8 | 0.5 | 0.02 | 0.004 | — | ○ | steel of the invention |
| 49 | A | 650 | ○ | ○ | 770 | 190 | 5.8 | 0.5 | 0.02 | 0.004 | — | ○ | steel of the invention |
| 50 | A | 570 | ○ | ● | 800 | 90 | 5.8 | 0.5 | 0.02 | 0.004 | — | ○ | steel of the invention |
| 51 | I | 570 | ○ | ⊙ | 800 | 200 | 5.8 | 0.5 | 0.02 | 0.004 | — | ○ | steel of the invention |
| 52 | A | 600 | ○ | ○ | 820 | 90 | 5.8 | 0.5 | — | — | — | ○ | steel of the invention |
| 53 | A | 650 | ○ | ○ | 790 | 120 | 1.2 | 0.9 | 0.02 | 0.004 | — | ○ | steel of the invention |
| 54 | A | 570 | ○ | ● | 800 | 70 | 1.2 | 0.9 | 0.02 | 0.004 | — | ○ | steel of the invention |
| 55 | A | 690 | ○ | ⊙ | 830 | 75 | 1.2 | 0.9 | 0.02 | 0.004 | — | ○ | steel of the invention |
| 56 | I | 600 | ○ | ⊙ | 800 | 200 | 1.2 | 0.9 | 0.02 | 0.004 | — | ○ | steel of the invention |
| 57 | I | 600 | ○ | ⊙ | 820 | 90 | 1.2 | 0.9 | 0.02 | 0.004 | — | ○ | steel of the invention |
| 58 | A | 570 | ○ | ● | 790 | 100 | 1.2 | 0.9 | — | — | — | ○ | steel of the invention |
| 59 | A | 650 | ○ | ○ | 850 | 20 | 2.1 | 1.9 | 0.02 | 0.004 | — | ○ | steel of the invention |
| 60 | A | 650 | ○ | ○ | 800 | 60 | 2.1 | 1.9 | 0.02 | 0.004 | — | ○ | steel of the invention |
| 61 | A | 650 | ○ | ○ | 770 | 170 | 2.1 | 1.9 | 0.02 | 0.004 | — | ○ | steel of the invention |
| 62 | I | 610 | ○ | ⊙ | 800 | 200 | 2.1 | 1.9 | 0.02 | 0.004 | — | ○ | steel of the invention |
| 63 | A | 570 | ○ | ● | 830 | 25 | 2.1 | 1.9 | — | — | — | ○ | steel of the invention |
| 64 | I | 610 | ○ | ⊙ | 810 | 120 | 2.1 | 1.9 | — | — | — | ○ | steel of the invention |
| 65 | A | 650 | ○ | ○ | 810 | 90 | 3.2 | 2.8 | 0.025 | 0.005 | — | ○ | steel of the invention |
| 66 | A | 650 | ○ | ○ | 850 | 15 | 3.2 | 2.8 | 0.025 | 0.005 | — | ○ | steel of the invention |
| 67 | A | 650 | ○ | ○ | 780 | 160 | 3.2 | 2.8 | 0.025 | 0.005 | — | ○ | steel of the invention |
| 68 | I | 600 | ○ | ⊙ | 800 | 180 | 3.2 | 2.8 | 0.025 | 0.005 | — | ○ | steel of the invention |
| 69 | I | 600 | ○ | ⊙ | 780 | 210 | 3.2 | 2.8 | 0.025 | 0.005 | — | ○ | steel of the invention |
| 70 | A | 570 | ○ | ● | 800 | 80 | 3.2 | 2.8 | — | — | — | ○ | steel of the invention |
| 71 | I | 610 | ○ | ⊙ | 850 | 50 | 3.2 | 2.8 | — | — | — | ○ | steel of the invention |
| 72 | A | 650 | ○ | ○ | 760 | 150 | 3.2 | 2.8 | 0.025 | 0.005 | 0.03 | ○ | steel of the invention |
| 73 | A | 650 | ○ | ○ | 830 | 75 | 3.2 | 2.8 | 0.025 | 0.005 | 0.03 | ○ | steel of the invention |
| 74 | A | 570 | ○ | ● | 810 | 30 | 3.2 | 2.8 | 0.025 | 0.005 | 0.03 | ○ | steel of the invention |
| 75 | I | 570 | ○ | ⊙ | 800 | 200 | 3.2 | 2.8 | 0.025 | 0.005 | 0.03 | ○ | steel of the invention |
| 76 | O | 690 | ○ | ⊙ | 820 | 100 | 5.9 | 2.8 | 0.019 | 0.0041 | 0.03 | ○ | steel of the invention |
| 77 | O | 570 | ○ | ● | 800 | 60 | 5.9 | 2.8 | 0.019 | 0.0041 | 0.03 | ○ | steel of the invention |
| 78 | O | 650 | ○ | ○ | 830 | 45 | 6.2 | 2.9 | 0.025 | 0.005 | — | ○ | steel of the invention |
| 79 | O | 570 | ○ | ● | 810 | 60 | 6.2 | 2.9 | 0.025 | 0.005 | — | ○ | steel of the invention |
| 80 | O | 690 | ○ | ⊙ | 800 | 150 | 5.8 | 0.5 | 0.02 | 0.004 | — | ○ | steel of the invention |
| 81 | O | 570 | ○ | ● | 760 | 90 | 1.2 | 0.9 | 0.02 | 0.004 | — | ○ | steel of the invention |
| 82 | O | 650 | ○ | ○ | 780 | 120 | 2.1 | 1.9 | 0.02 | 0.004 | — | ○ | steel of the invention |
| 83 | O | 650 | ○ | ○ | 780 | 120 | 2.1 | 1.9 | — | — | — | ○ | steel of the invention |
| 84 | O | 690 | ○ | ⊙ | 790 | 100 | 3.2 | 2.8 | 0.025 | 0.005 | — | ○ | steel of the invention |

TABLE 4

| Steel | Resistance to liquid metal embrittlement cracking |
|---|---|
| A | ○ |
| B | ○ |
| C | ○ |
| D | ○ |
| E | ○ |
| F | ○ |
| G | ○ |
| H | ○ |
| I | ○ |
| J | ○ |
| K | × |
| L | × |
| M | × |
| N | × |
| O | ○ |

It was understood that good coating adhesion was obtained within the range of the reduction heat treatment determined in the invention.

REFERENCE SIGNS LIST 1 test piece
2 boss
3 welding bead
4 bead overlapping portion
5 cut cross sectional surface

The invention claimed is:

1. A method for producing a hot-dip zinc alloy coated steel sheet excellent in coating adhesion, comprising: hot-rolling a steel sheet, as a base sheet for coating, consisting of from 0.01 to 0.20% of C, from 0.030% or less of P, 0.010% or less of S, from 0.010 to 0.150% of Ti, 0.100% or less of sol. Al, less than 0.010% of N, from 0.0003 to 0.0100% of B, and at least one selected from the group consisting of from 0.01 to 1.00% of Si, from 0.10 to 2.50% of Mn, and from 0.05 to 1.00% of Cr, all in terms of percentage by mass, with the balance of Fe and unavoidable impurities; subjecting the base sheet for coating to a reduction heat treatment; and subjecting the base sheet for coating to hot-dip zinc alloy coating containing from 1.0 to 22.0% of Al and from 0.1 to 10.0% of Mg, all in terms of percentage by mass, with the balance of Zn and unavoidable impurities, a coiling temperature in the hot-rolling step of the base sheet for coating being in a range of from 550 to 700° C., and in the reduction heat treatment, assuming that a period of time during which a temperature on a surface of the steel sheet is maintained to 750° C. to 860° C. in a furnace for the reduction heat treatment is designated as a retention time, and the maximum achieving temperature of the surface of the steel sheet in the furnace is designated as a reduction heat treatment temperature, performing the reduction heat treatment, at a reduction heat treatment temperature of from 750 to 860° C., for a retention time of 250 seconds or less in the case where the concentrations of Si and Mn in a portion within 4 μm from the surface of the steel sheet before the reduction heat treatment satisfy the condition A shown below, a retention time of 200 seconds or less in the case where the concentrations satisfy the condition B shown below, or a retention time of 150 seconds or less in the case where the concentrations satisfy the condition C shown below:

concentrations of Si and Mn in a portion within 4 μm from the surface of the steel sheet before the reduction heat treatment (in terms of percentage by mass)
A: 0.15% or less of Si and 0.8% or less of Mn
B: 0.6% or less of Si and 1.5% or less of Mn, but condition A not satisfied
C: more than 0.6% of Si and more than 1.5% of Mn.

2. The method for producing a hot-dip zinc alloy coated steel sheet excellent in coating adhesion according to claim 1, wherein the hot-dip zinc alloy coating has a composition further containing at least one selected from the group consisting of 0.10% or less of Ti, 0.05% or less of B, and 2.0% or less of Si, all in terms of percentage by mass.

3. A method for producing a hot-dip zinc alloy coated steel sheet excellent in coating adhesion, comprising: hot-rolling a steel sheet, as a base sheet for coating, consisting of from 0.01 to 0.20% of C, from 0.030% or less of P, 0.010% or less of S, from 0.010 to 0.150% of Ti, 0.100% or less of sol. Al, less than 0.010% of N, from 0.0003 to 0.0100% of B, and at least one selected from the group consisting of from 0.01 to 1.00% of Si, from 0.10 to 2.50% of Mn, and from 0.05 to 1.00% of Cr, and one or more of 0.10% or less of Nb and 0.50% or less of Mo, all in terms of percentage by mass, with the balance of Fe and unavoidable impurities; subjecting the base sheet for coating to a reduction heat treatment; and subjecting the base sheet for coating to hot-dip zinc alloy coating containing from 1.0 to 22.0% of Al and from 0.1 to 10.0% of Mg, all in terms of percentage by mass, with the balance of Zn and unavoidable impurities, a coiling temperature in the hot-rolling step of the base sheet for coating being in a range of from 550 to 700° C., and in the reduction heat treatment, assuming that a period of time during which a temperature on a surface of the steel sheet is maintained to 750° C. to 860° C. in a furnace for the reduction heat treatment is designated as a retention time, and the maximum achieving temperature of the surface of the steel sheet in the furnace is designated as a reduction heat treatment temperature, performing the reduction heat treatment, at a reduction heat treatment temperature of from 750 to 860° C., for a retention time of 250 seconds or less in the case where the concentrations of Si and Mn in a portion within 4 μm from the surface of the steel sheet before the reduction heat treatment satisfy the condition A shown below, a retention time of 200 seconds or less in the case where the concentrations satisfy the condition B shown below, or a retention time of 150 seconds or less in the case where the concentrations satisfy the condition C shown below:

concentrations of Si and Mn in a portion within 4 μm from the surface of the steel sheet before the reduction heat treatment (in terms of percentage by mass)
A: 0.15% or less of Si and 0.8% or less of Mn
B: 0.6% or less of Si and 1.5% or less of Mn, but condition A not satisfied
C: more than 0.6% of Si and more than 1.5% of Mn.

4. The method for producing a hot-dip zinc alloy coated steel sheet excellent in coating adhesion according to claim 3, wherein the hot-dip zinc alloy coating has a composition further containing at least one selected from the group consisting of 0.10% or less of Ti, 0.05% or less of B, and 2.0% or less of Si, all in terms of percentage by mass.

* * * * *